United States Patent
Srinivasan

(10) Patent No.: US 11,550,344 B2
(45) Date of Patent: Jan. 10, 2023

(54) QUICK DOME LOADING PILOT VALVE

(71) Applicant: Emerson Automation Solutions Final Control US LP, Stafford, TX (US)

(72) Inventor: Anand Srinivasan, Katy, TX (US)

(73) Assignee: Emerson Automation Solutions Final Control US LP, Houston, TX (US)

( * ) Notice: Subject to any disclaimer, the term of this patent is extended or adjusted under 35 U.S.C. 154(b) by 1 day.

(21) Appl. No.: 16/937,336

(22) Filed: Jul. 23, 2020

(65) Prior Publication Data
US 2021/0026381 A1    Jan. 28, 2021

Related U.S. Application Data

(60) Provisional application No. 62/878,047, filed on Jul. 24, 2019.

(51) Int. Cl.
*G05D 16/16* (2006.01)
*F16K 17/32* (2006.01)

(52) U.S. Cl.
CPC .......... *G05D 16/166* (2013.01); *F16K 17/32* (2013.01); *Y10T 137/7762* (2015.04)

(58) Field of Classification Search
CPC ................ G05D 16/166; Y10T 137/7762
See application file for complete search history.

(56) References Cited

U.S. PATENT DOCUMENTS

| | | | |
|---|---|---|---|
| 4,586,533 A | 5/1986 | Estes | |
| 4,609,008 A * | 9/1986 | Anderson, Jr. | G05D 16/163 137/488 |
| 4,682,495 A * | 7/1987 | McNeely | F16K 37/0091 137/488 |
| 4,779,639 A | 10/1988 | Loos et al. | |
| 4,848,397 A * | 7/1989 | Bickford | F16K 17/105 137/489 |
| 4,917,144 A * | 4/1990 | Giles | G05D 16/16 137/488 |
| 5,027,852 A * | 7/1991 | McNeely | G05D 16/187 137/488 |
| 5,064,169 A * | 11/1991 | Alberts | F16K 17/0433 137/488 |

(Continued)

FOREIGN PATENT DOCUMENTS

| | | |
|---|---|---|
| GB | 1068447 | 5/1967 |
| WO | 0238994 A1 | 5/2002 |

OTHER PUBLICATIONS

Emerson Anderson Greenwood Series 200/400/500/700/800 Pilot Operated Relief Valves, technical data, Copyright 2017 Emerson, 64 pages.

(Continued)

*Primary Examiner* — Robert K Arundale
(74) *Attorney, Agent, or Firm* — Quarles & Brady LLP

(57) ABSTRACT

A flow arrangement for a control valve can include a plurality of flow-control components that are movable relative to each other and that define at least part of a flow path from a pressure source to a dome of a pressure relief valve. The flow-control components can be movable relative to each other in response to system pressure to selectively increase or decrease the flow capacity of the flow path. In some cases, flow capacity can be increased or decreased during initial loading of the dome, at low pressures, or at higher pressures.

20 Claims, 12 Drawing Sheets

(56) References Cited

U.S. PATENT DOCUMENTS

| | | | | |
|---|---|---|---|---|
| 5,725,015 A * | 3/1998 | Theodos | ............... | G05D 16/166 |
| | | | | 137/488 |
| 5,950,657 A * | 9/1999 | Lai | ....................... | G05D 16/166 |
| | | | | 137/625.69 |
| 6,209,557 B1 | 4/2001 | Lai et al. | | |
| 6,209,577 B1 * | 4/2001 | Lai | ....................... | G05D 16/166 |
| | | | | 137/489.5 |
| 6,318,406 B1 | 11/2001 | Conley | | |
| 6,386,227 B1 * | 5/2002 | Powell | .................. | F16K 17/105 |
| | | | | 137/488 |
| 2018/0045118 A1 * | 2/2018 | Coretto | .................... | F16K 3/24 |

OTHER PUBLICATIONS

Emerson Anderson Greenwood Series 5200 Pilot Operated Pressure Relief Valves, technical data, Copyright 2017 Emerson, 20 pages.
Groth Corporation Pilot Operated Relief Valve Series 1660A, technical data, Section 6:1660 Brch.qxd, Jun. 2002, 2.5m, Groth Corporation, a Continental Disc company, Stafford, TX, USA.

* cited by examiner

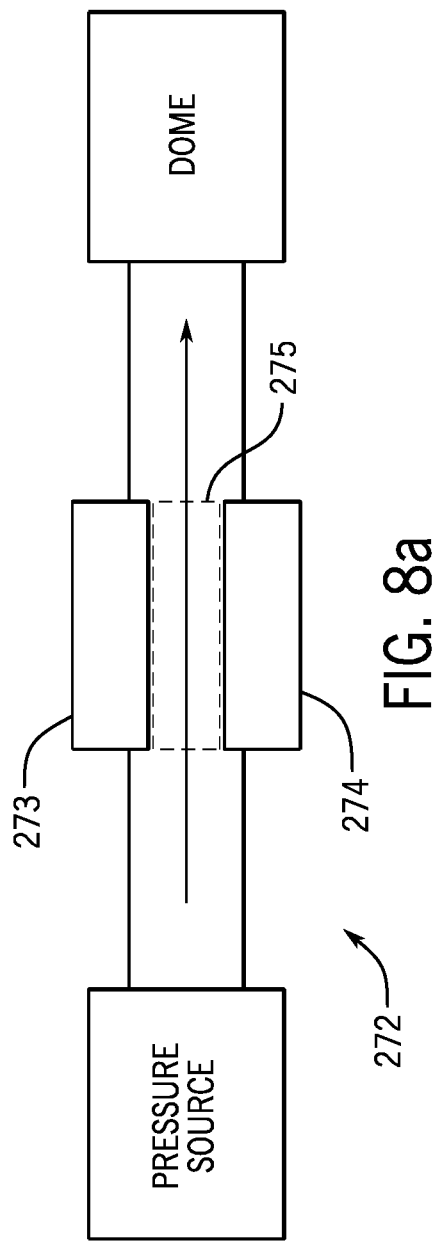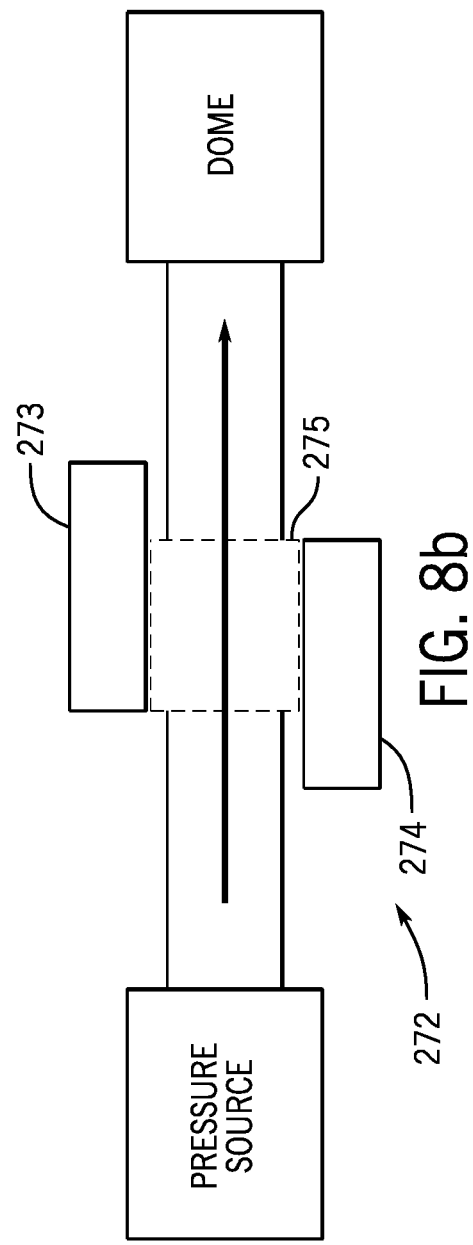

QUICK DOME LOADING PILOT VALVE

CROSS REFERENCE TO RELATED APPLICATIONS

This application claims priority to U.S. Provisional Patent Application No. 62/878,047, titled "Quick Dome Loading Pilot Valve" and filed Jul. 24, 2019, the entirety of which is incorporated herein by reference.

BACKGROUND

Pilot-operated pressure relief valves can be used in a variety of industrial, commercial, and other settings to relieve pressure from a system during overpressure events. Unlike direct acting pressure relief valves, conventional pilot-operated pressure relief valves include a main valve for control of relief venting and a pilot valve to control operation of the main valve. In some arrangements, the main valve has a "dome" that is pressurized by fluid that flows from a pressure source, typically from the system being protected, through the pilot valve, so that the pressure above and below the main valve are substantially equal during normal operation (e.g., after initial loading of the dome). The pilot valve can be configured to provide a particular set pressure threshold, so that if the pressure in the system being protected exceeds the set pressure, a dome-exhaust flow path in the pilot valve is opened to exhaust fluid from the dome. This lowers the pressure in the dome, thereby allowing the main valve to open to vent excess pressure from the system line. Once the system line pressure reduces sufficiently below the set pressure, the dome-exhaust flow path can close and the pilot valve can, as appropriate, direct flow from the system line to re-pressurize (i.e., re-load) the dome.

Compared to direct spring operated pressure relief valves, pilot-operated pressure relief valves can be smaller in size and can typically operate closer to set pressure. Pilot operated pressure relief valves can be used in challenging applications and can be offered with a variety of accessories.

SUMMARY

Some embodiments provide a control valve to be arranged between a pressure source and a dome of a pressure relief valve. The flow arrangement can include a first flow-control component and a second flow-control component. The first and second flow-control components can define at least part of a flow path from the pressure source to the dome and at least one of the first or second flow-control components can be movable along the other of the first or second flow-control components between a first configuration and a second configuration. The first configuration can define a first flow area of at least part of the flow path and the second configuration can define a second flow area of the at least part of the flow path that is smaller than the first flow area.

Some embodiments provide a pilot valve for control of a pressure relief valve with a dome, the pilot valve being in fluid communication with and selectively providing a flow path from the pressure source to the dome. The pilot valve can include a first flow-control component and a second flow-control component. The flow path can extend in between the first and second flow-control components from an entrance area to an exit area. The first and second flow-control components can be movable relative to each other from a first configuration to a second configuration. The relative movement of the first and second flow-control components from the first configuration to the second configuration can reduce the flow capacity of the flow path.

Some embodiments provide a pilot valve for control of a pressure relief valve with a dome to control movement of a main valve piston relative to a main valve seat, the pilot valve being in fluid communication with and selectively providing a flow path to the dome from a pressure source that is upstream of the main valve inlet. The pilot valve can include an outer spool and an inlet nozzle that is configured to move collectively with a feedback piston relative to the outer spool. The inlet nozzle and the outer spool can be arranged concentrically to define an annular region therebetween that extends between an entrance area and an exit area. At least one of the inlet nozzle or the outer spool can include at least one recess that is configured to be exposed at the entrance area when the outer spool and the inlet nozzle are in a first configuration but not when the outer spool and the inlet nozzle are in a second configuration.

Some embodiments provide a pilot valve for control of a main valve in a pressure relief valve assembly, the main valve having a dome to control movement of a main valve piston relative to a main valve seat. The pilot valve can be configured to be in fluid communication with and selectively provide a flow path to the dome from a pressure source that is upstream of the main valve seat, and can include an outer spool and an inlet nozzle that is configured to move collectively with a feedback piston relative to the outer spool. The inlet nozzle and the outer spool can be arranged concentrically to define an annular region therebetween that extends between an entrance area and an exit area. At least one of the inlet nozzle or the outer spool can include one or more of a recess or a port that extends at least partly along the annular region and is configured to be in: a first position relative to one or more of the entrance area or the exit area, when the outer spool and the inlet nozzle are in a first configuration; and a second position relative to the one or more of the entrance area or the exit area, when the outer spool and the inlet nozzle are in a second configuration. When in the first position, as compared to the second position, the one or more of the recess or the port can provide increased flow capacity for flow along the annular region.

Some embodiments provide a valve for control of flow between a pressure source and a dome of a main valve in a pressure relief valve assembly. The valve can include a first flow-control component and a second flow-control component. The first and second flow-control components can be configured to define at least part of a flow path from the pressure source to the dome, and at least one of the first or second flow-control components can be movable along the other of the first or second flow-control components between a first configuration and a second configuration. In the first configuration, the first and second flow-control components can be configured to define a first flow area of the at least part of the flow path and, in the second configuration, the first and second flow-control components can be configured to define a second flow area of the at least part of the flow path that is smaller than the first flow area.

Some embodiments provide a pilot valve for control of a pressure relief valve with a dome. The pilot valve can be configured to be in fluid communication with a pressure source and to selectively provide a flow path from the pressure source to the dome, and can include a first flow-control component and a second flow-control component. The flow path can extend along an area between the first and second flow-control components, from an entrance area to an exit area. The first and second flow-control components can be movable relative to each other between a first configuration and a second configuration. Relative movement of the first and second flow-control components from the first configuration to the second configuration can reduce a flow capacity of the flow path between the entrance area and the exit area.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIGS. 8a and 8b are schematic diagrams of a flow-control arrangement according to an embodiment of the invention.

DETAILED DESCRIPTION

Figure 1A:
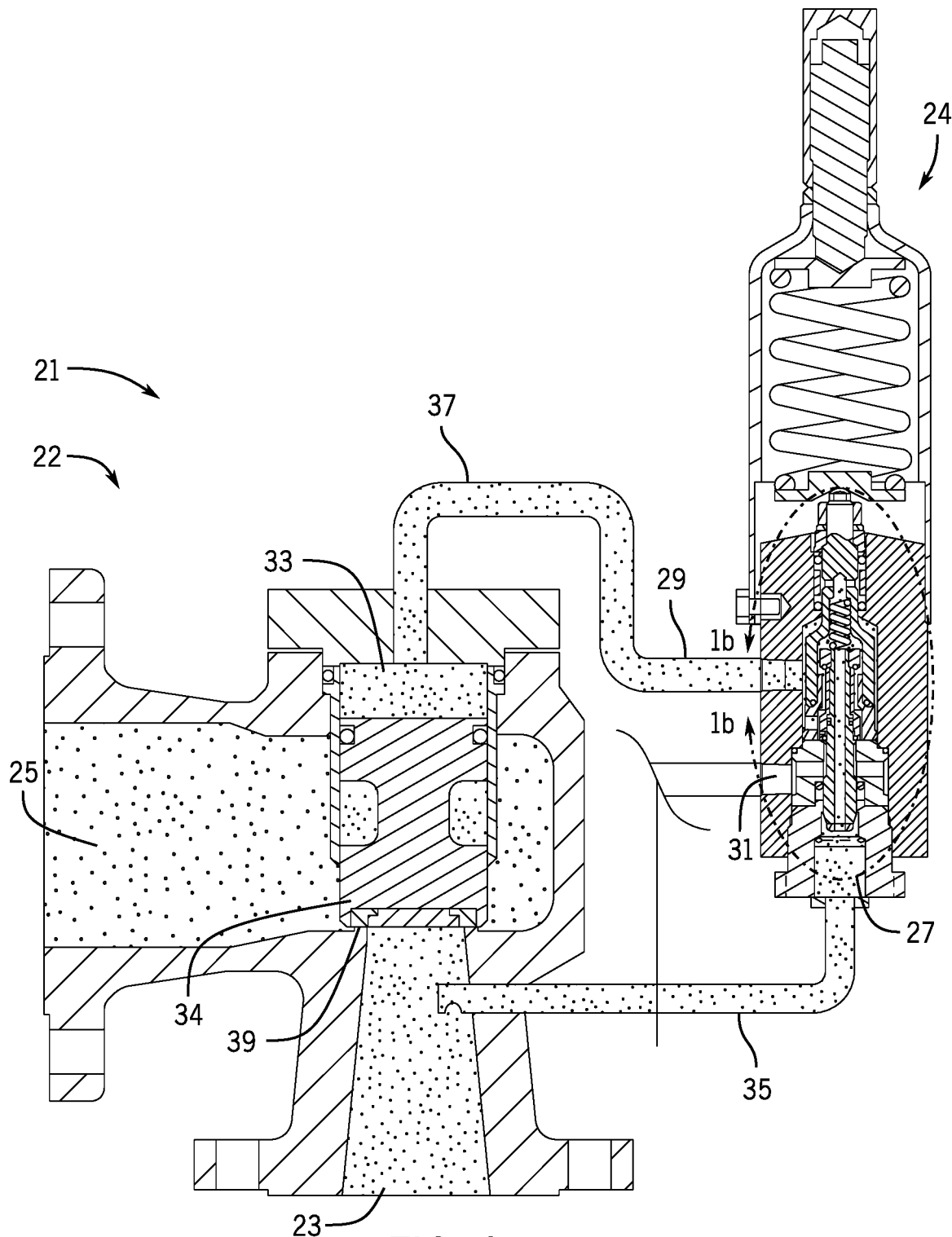
FIGS. 1a through 3b are schematic views of a conventional pilot-operated pressure relief valve.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," "secured," and "coupled" and variations thereof, as used with reference to physical connections, are used broadly and encompass both direct and indirect mountings, connections, supports, and couplings. Further, unless otherwise specified or limited, "connected," "attached," or "coupled" are not restricted to physical or mechanical connections, attachments or couplings.

As used herein, unless otherwise specified or limited, "at least one of A, B, and C," "at least one of A, B, or C" and similar other phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the categories A, B, and/or C."

Conventional pilot-operated valves can provide substantial benefits, such as those described above. But conventional designs also sometimes do not stay closed during loading of the dome (e.g., during system start-up). For example, internal components of a pilot valve may often provide somewhat constricted flow passages between a system line and a dome, such as may be appropriate to comply with certain design constraints. However, because fluid must pass through these constricted passages to fill the main valve dome, pressure in the dome may sometimes lag system pressure, particularly during initial loading of the dome or other low-pressure operation. This problem can also be especially pronounced in liquid applications, due to the nearly incompressible nature of liquids, although some examples discussed herein may also be useful in gas applications. Further, as a result of this pressure lag, rapid increases in system pressure can cause the main valve to open and close multiple times before the dome pressure is sufficient to hold the main valve closed. This can cause undesirable effects, including water hammer, or rapid cycling of the main valve, which can cause undesired venting of line fluid and even damage the main valve seat or other valve components.

In view of these issues, and others, it may therefore be useful to provide a control valve, e.g., a valve configured to control the operation of another valve (such as a pilot valve for a pilot-operated pressure relief valve), that can load a main valve dome more quickly than can control valves of conventional designs. Embodiments of the invention can provide this benefit, among others. Some embodiments may be particularly useful in the context of pilot-operated pressure relief valves, as further discussed below. In some cases, however, the principles disclosed herein can be used with other valves that have similarly arranged domes and pilot valves.

The relative position of flow-control components within a conventional pilot-operated pressure relief valve assembly 21 during various stages of operation is shown in FIGS. 1a through 3b. FIGS. 1a and 1b illustrate the main valve 22 (which may also generally be referred to as the pressure relief valve) when the system pressure (i.e., the fluid pressure at a main valve inlet 23) is below the set pressure of the pilot valve 24. System pressure is transmitted via tubing 35 from the inlet 23 to the pilot valve inlet 27, which, as shown in FIG. 1b in particular, is fluidly coupled to the pilot valve sense chamber 32 through a central longitudinal channel 43 in an inner spool 38 and radial channels 30 in a feedback piston 41. In the state illustrated in FIGS. 1a and 1b, the fluid pressure in the sense chamber 32 is significantly less than the set point of the pilot valve 24. In this state, an upper portion of the inlet nozzle 40 is spaced away from the inlet seat 28, thereby permitting fluid transmission through an annular channel 46 between the inlet nozzle 40 and the outer spool 42. In the configuration illustrated in FIGS. 1a and 1b, the annular channel 46 is fluidly coupled to the pilot dome port 29, which is coupled to a main valve dome 33 via tubing 37 (see FIG. 1a). Thus, in the illustrated state, in which system pressure is below the pilot valve set point, the pilot valve 24 routes system pressure to the dome 33. The substantially equal pressures at the inlet 23 and dome 33, combined with the weight of the valve piston 34, result in a sealing contact being maintained between the relief valve piston 34 and the relief valve seat 39 to prevent fluid flow between the inlet 23 and outlet 25.

Figure 2A:
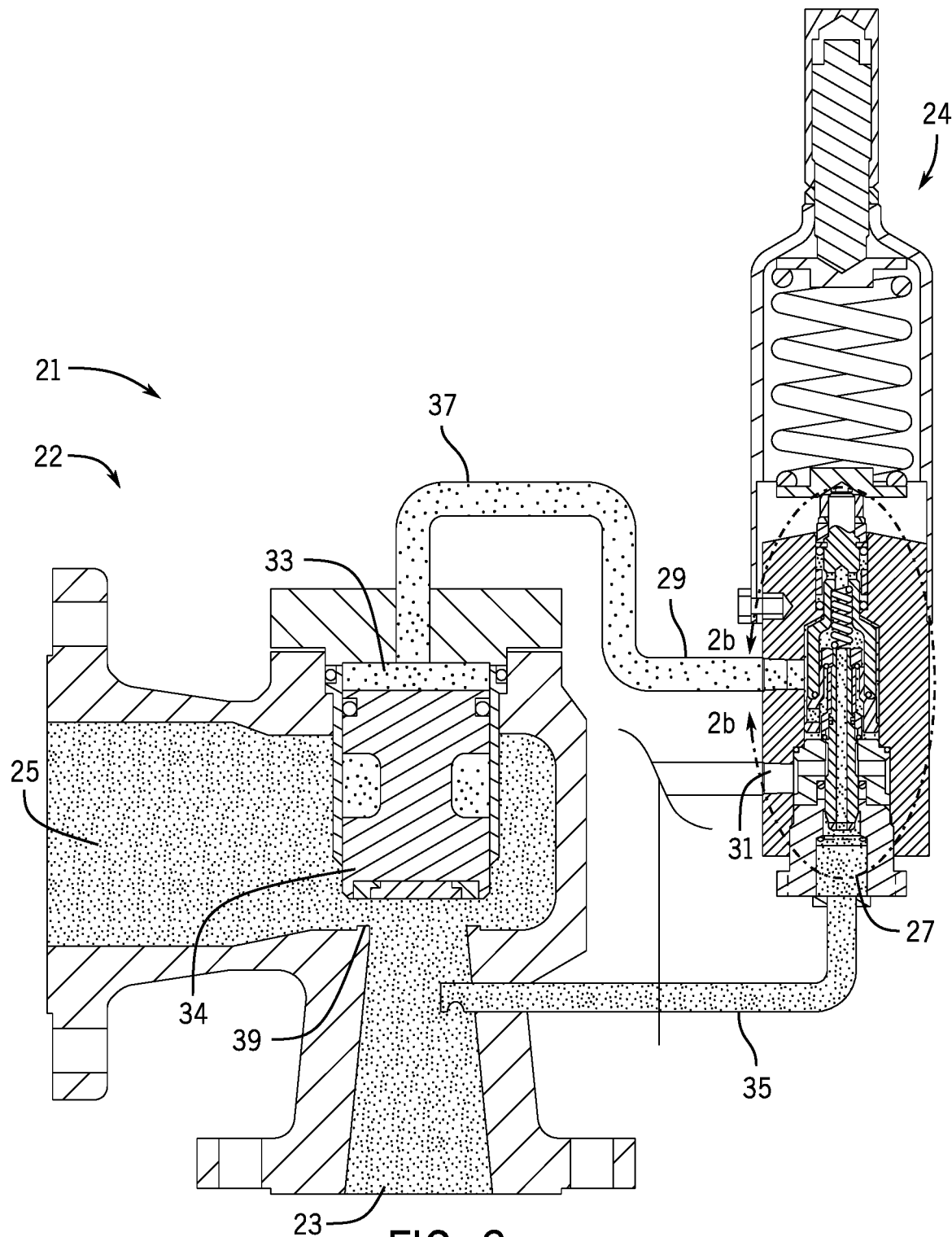
Figure 2B:
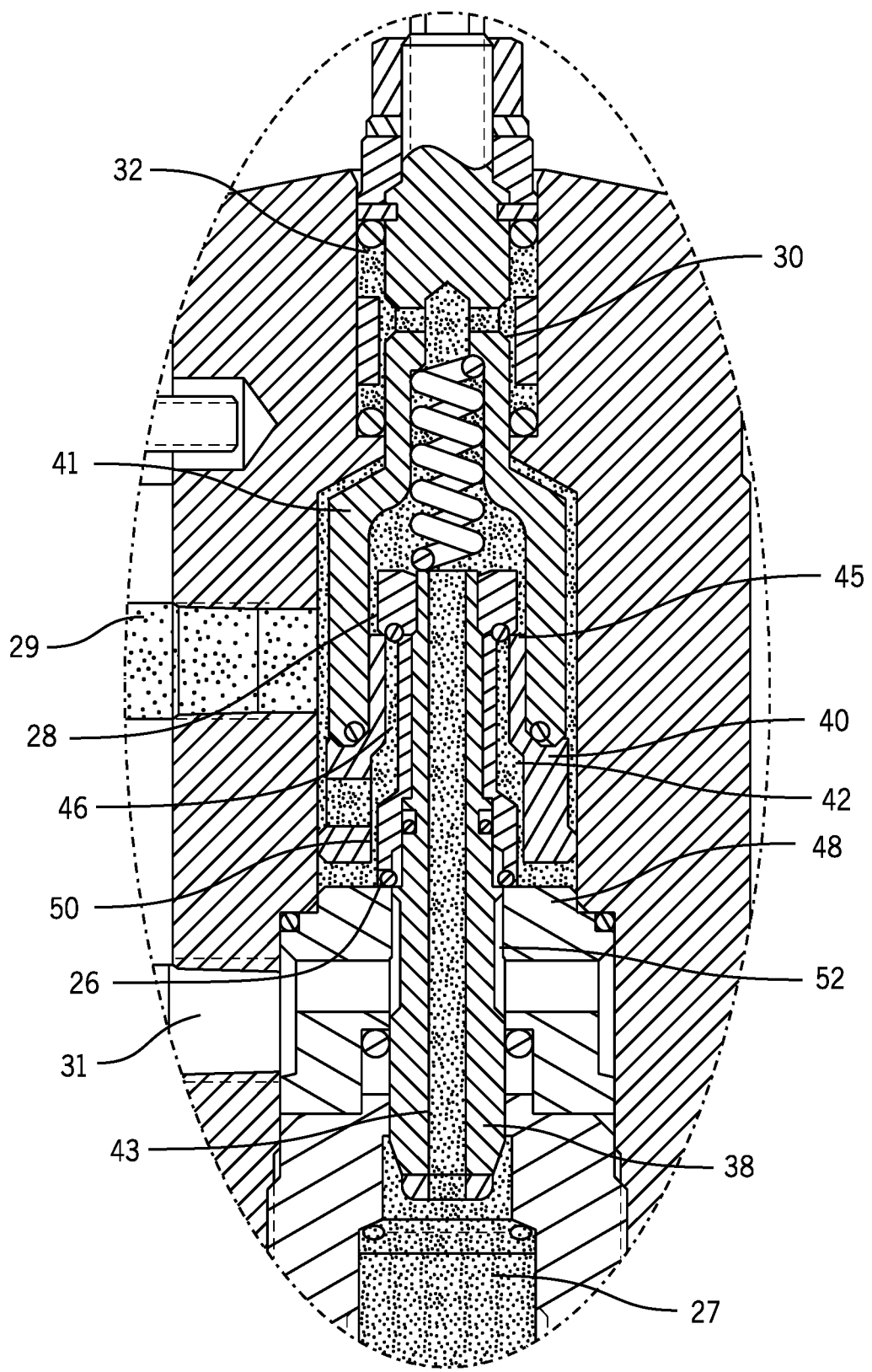

FIGS. 2a and 2b show the main valve 22 when the system pressure is slightly above the pilot valve set pressure. Here, the increase in system pressure in the sense chamber 32 has caused an upward movement of the feedback piston 41 and the connected inlet nozzle 40, which upward movement results in sealing contact between the upper portion 45 of the inlet nozzle 40 and the inlet seat 28. This sealing contact between the inlet nozzle 40 and the inlet seat 28, in turn, blocks the annular channel 46, thus preventing the transmission of fluid from the pilot valve inlet 27 to the dome 33 and isolating the dome 33 from both the pilot valve inlet 27. Similarly, sealing contact between an outlet seat 26 and an outlet nozzle 48 also isolates the dome 33 from an outlet port 11.

With the main valve 22 in the state illustrated in FIGS. 2a and 2b, further increases in system pressure cause a further upward movement of the feedback piston 41 and the connected inlet nozzle 40, which results in a separation between the outlet seat 26 and the outlet nozzle 48. Such separation fluidly couples the dome port 29 and the outlet port 31 via an annular channel 50 between the inlet nozzle 40 and the outer spool 42 and an annular channel 52 between the inner spool 38 and the outlet nozzle 48. The fluid coupling between the dome port 29 and the outlet port 31 vents the dome 33 to the outlet port 31, which is typically connected via tubing to the outlet 25. The venting of the dome pressure results in a pressure imbalance across the relief valve piston 34 (i.e., a pressure imbalance between the system pressure at the inlet 23 and the pressure in the dome 33) such that the system pressure lifts the relief valve piston 34 off of the relief valve seat 39 and relieves system pressure from the inlet 23 to the outlet 25. Through this operation of the pilot valve 24, the main valve 22 accordingly modulates (e.g., floats between closed and fully open positions) to vent the minimum fluid required to abate the overpressure condition.

Figure 1B:
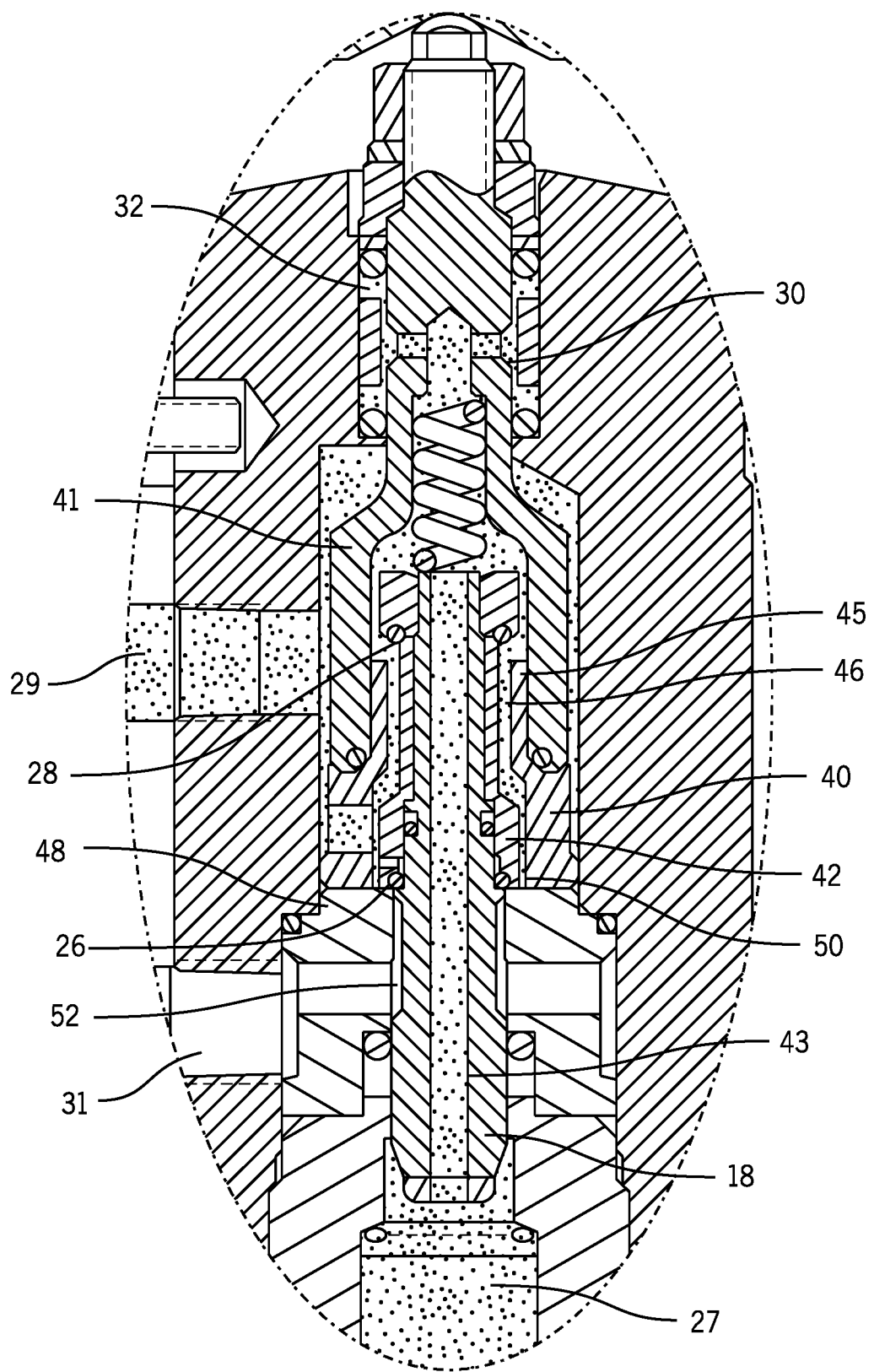
Figure 3A:
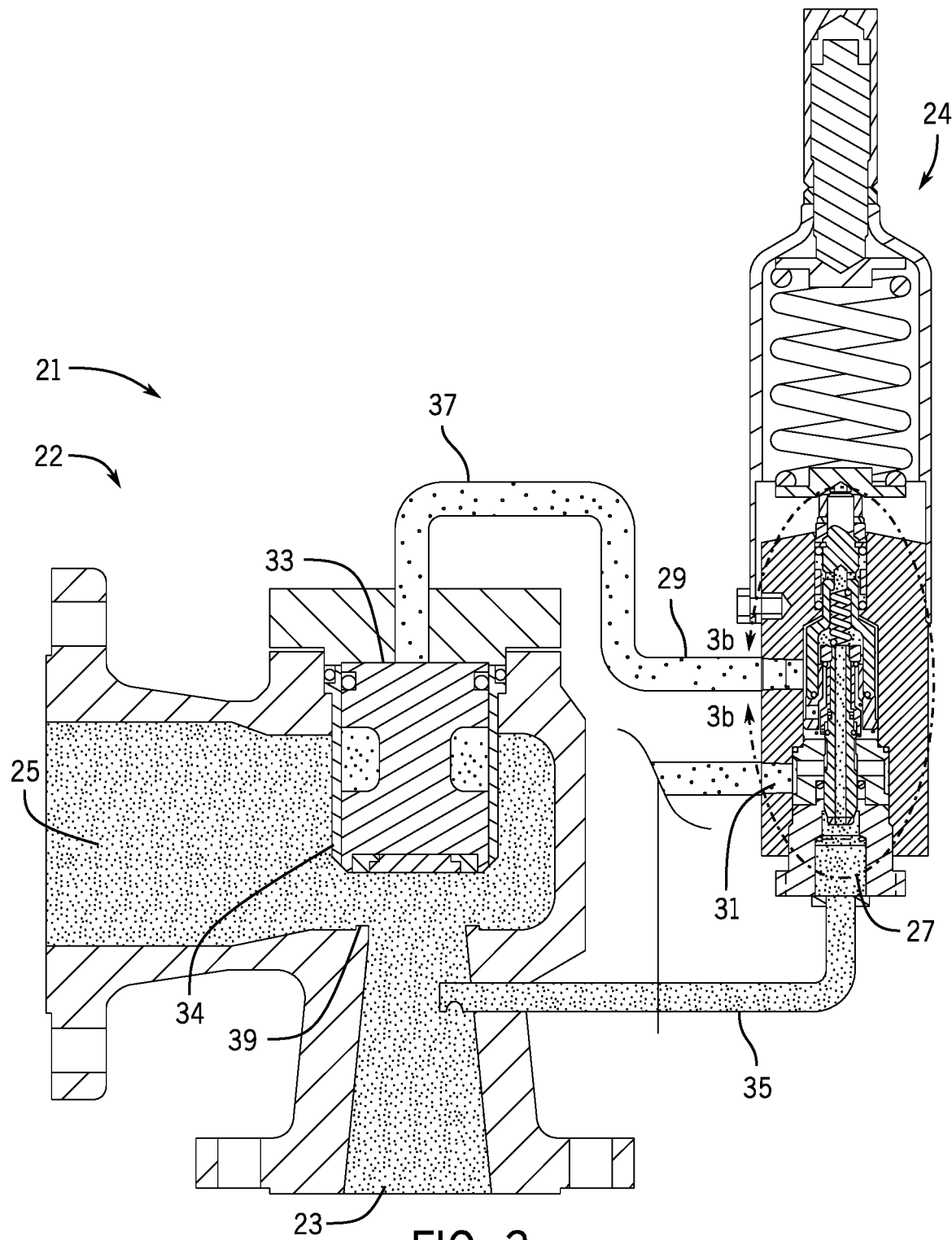
Figure 3B:
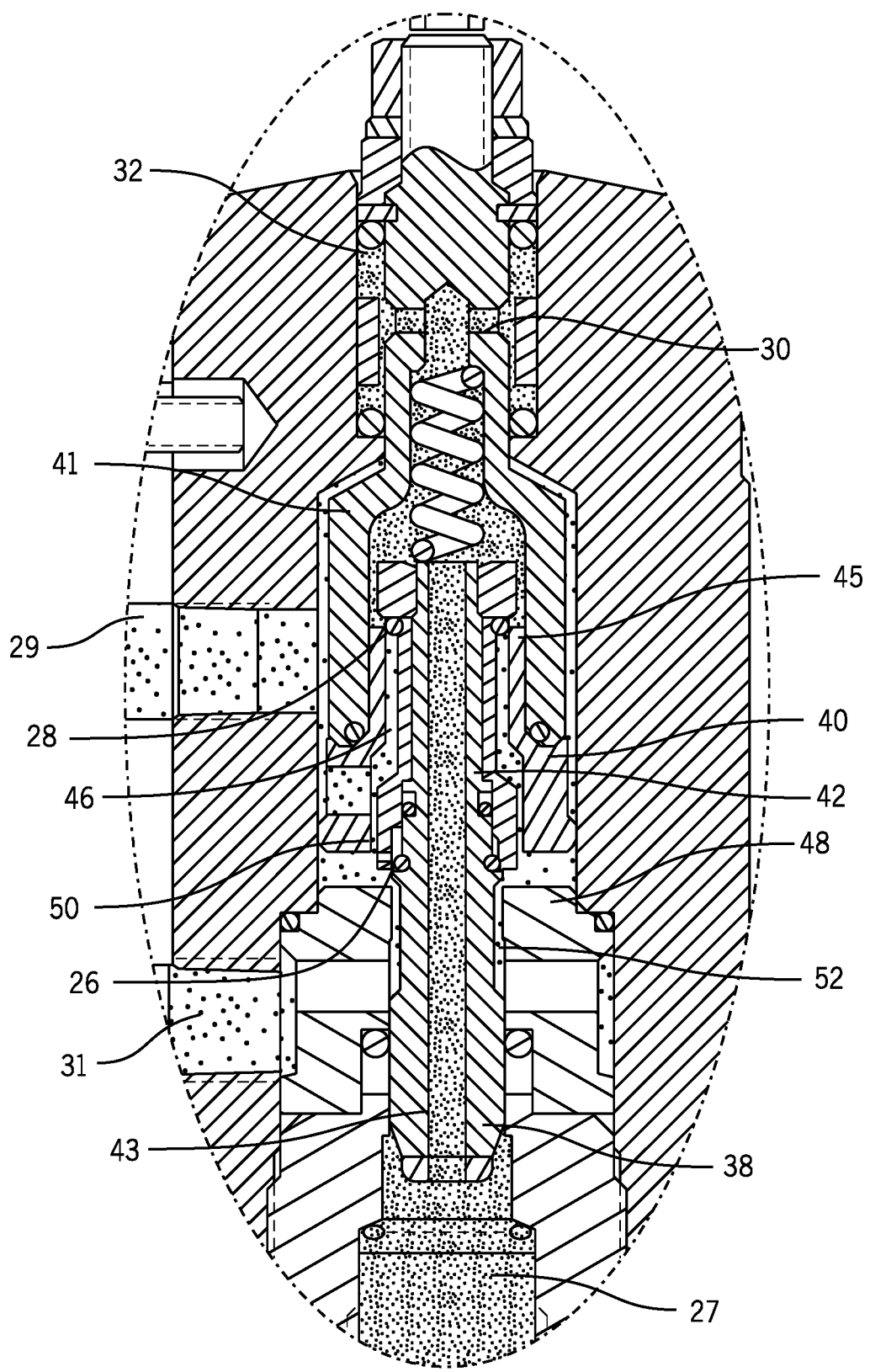

However, if the system pressure continues to increase, the main valve can fully open, as illustrated in FIGS. 3a and 3b. This is achieved by venting additional fluid pressure from the dome 33 (i.e., via fluid coupling between dome port 29 and outlet port 31) until the relief valve piston 34 achieves "full lift," as may be needed in cases when the overpressure event requires full valve relieving capacity. Once the system pressure is lowered to a level sufficiently below the pilot valve set point (called reseat pressure), the pilot valve can reset to allow system pressure from the inlet 23 into the dome 33, to reload the dome 33 and re-seat the main valve 22 (e.g., as shown in FIGS. 1a and 1b).

As illustrated in FIGS. 1a-3b, the annular channel 46, as collectively defined by the inlet nozzle 40 and the outer spool 42, provides a relatively restricted flow path between the main valve inlet 23 (and the protected system) and the main valve dome 33. This can be helpful for some operating conditions. For example, a restricted flow path can help to prevent rapid increases or decreases in dome pressure due to spikes in system pressure, which might otherwise cause the main valve 22 to rapidly close (e.g., as may result in water hammer effects) or cycle inappropriately. However, as also discussed above, the restricted flow path through the annular channel 46 can result in relatively slow pressurization of the dome 33, particularly during start-up conditions or reloading operations after a release event (e.g., after full lift of the valve), which can lead to undesired cycling of the main valve or other adverse effects.

Some embodiments of the invention provide a control valve that can address these or other problems, including in pilot valves otherwise configured similarly to the pilot valve 24. In some embodiments, one or more flow-control components of a control valve (e.g., a spool or nozzle) can move along one or more other components of the control valve during operation (e.g., a nozzle or spool), including when a pressure source fluctuates from a pressure below a control valve set pressure to a pressure at or above the set pressure. To help provide different rates of fluid flow during these pressure fluctuations, the flow-control component(s) can be configured to define a flow path between the pressure source and the main valve dome that has varied restriction of fluid flow depending on the relative position of the flow-control component(s). In particular, for example, the flow-control component(s) can be configured so that the relevant flow path is less restrictive (e.g., has a larger cross-sectional area) during loading of the dome and more restrictive (e.g., has a smaller cross-sectional area) when the dome has been appropriately pressurized (e.g., partly or fully loaded relative to system pressure).

In some embodiments, structural contours on a flow-control component can provide varied flow restriction depending on the position of the flow-control component. For example, a groove or port on a flow-control component can be configured to provide different effective flow areas for a particular flow path depending on the position of the flow-control component relative to one or more other components.

Figure 4:
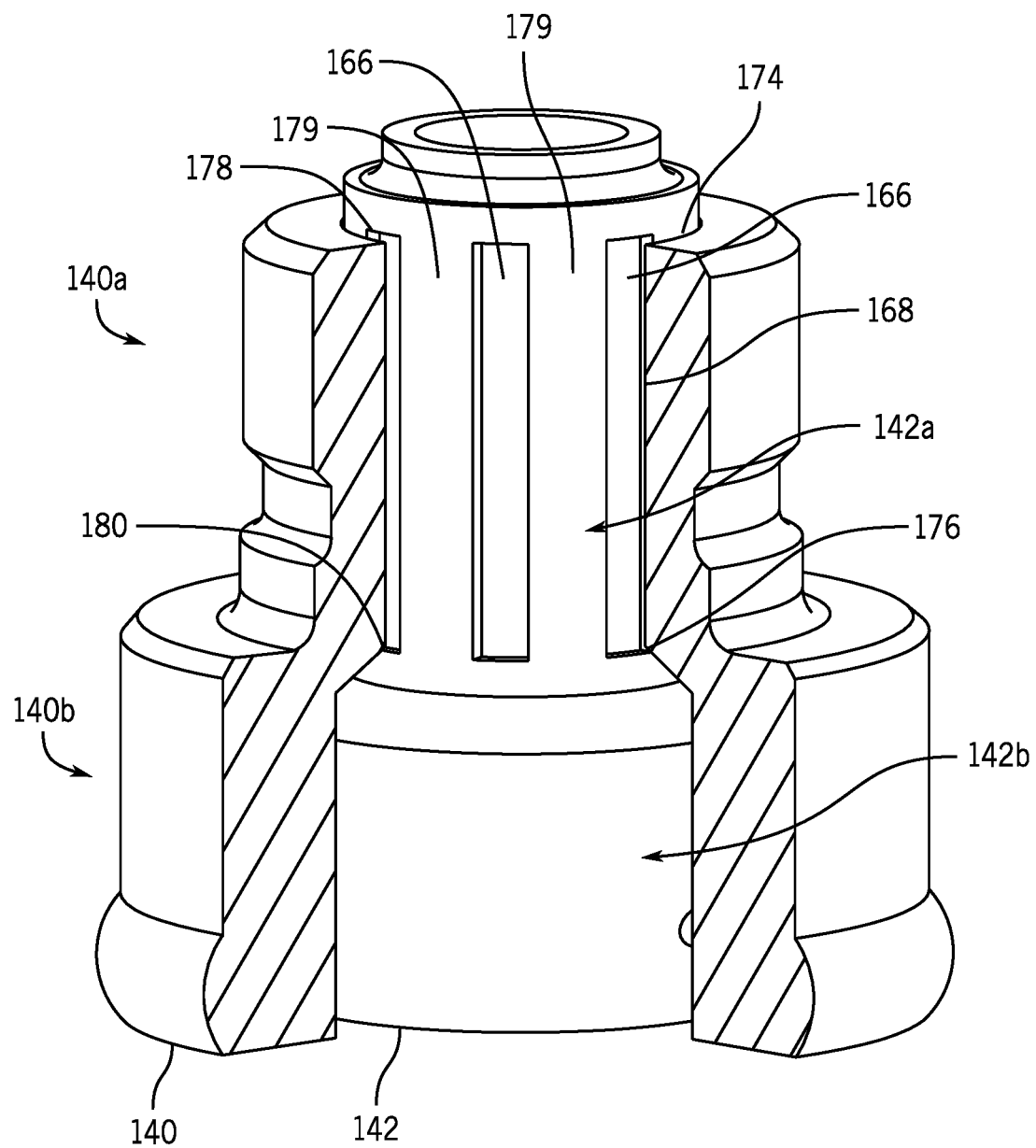
FIG. 4 is an isometric partial view of flow-control components of a control valve according to an embodiment of the invention, with one of the components being shown in a partial sectional view.
Figure 5:
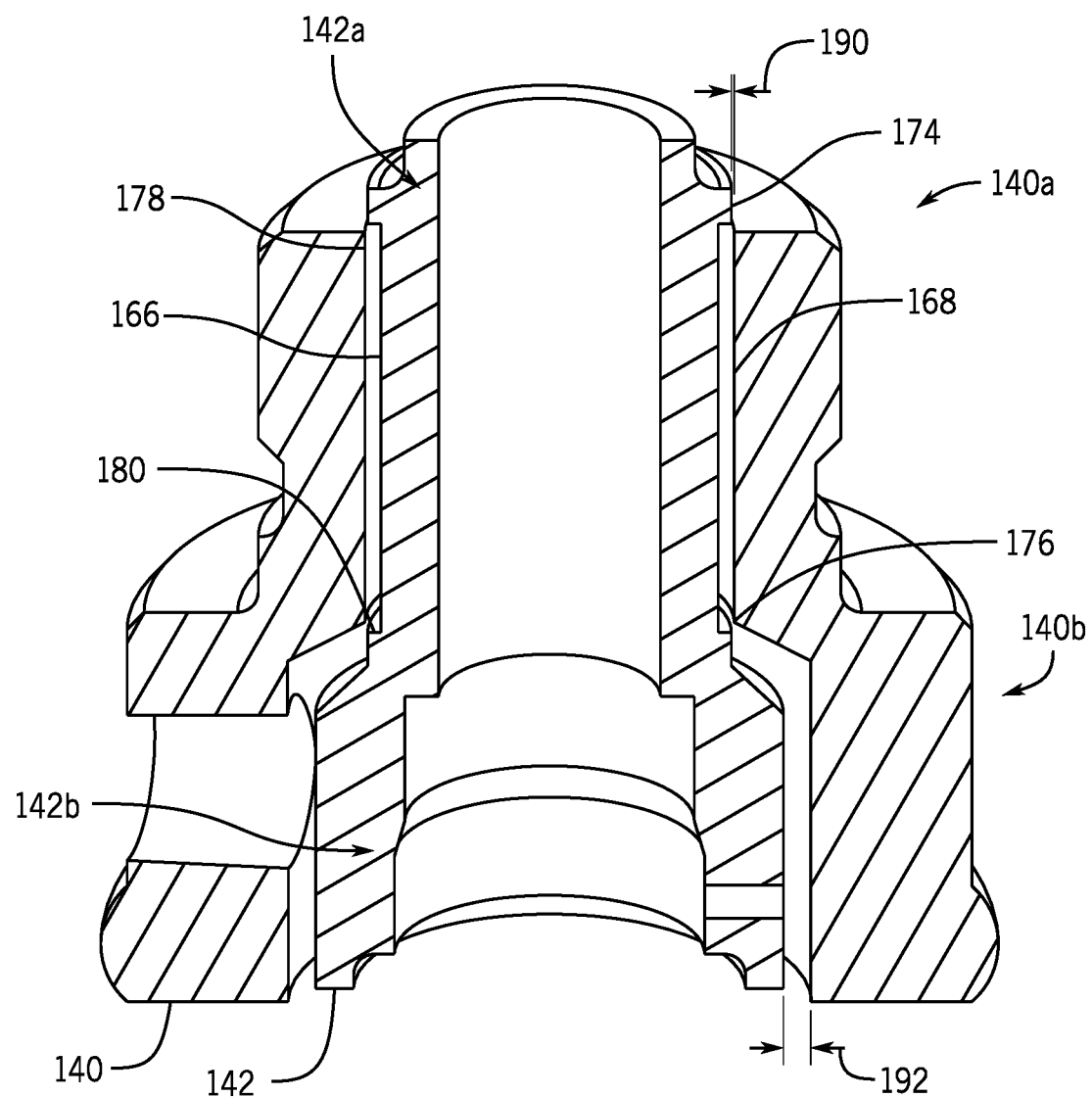
FIG. 5 is a cross-sectional, isometric partial view of the flow-control components of FIG. 4.

In this regard, FIGS. 4 and 5 illustrate a modified outer spool 142 in accordance with an aspect of this disclosure as can be used with an inlet nozzle 140 similar to the inlet nozzle 40. In some ways, the outer spool 142 and the inlet nozzle 140 are similar to the outer spool 42 and the inlet nozzle 40 as shown in FIGS. 1a-3b, and the outer spool 142 and the inlet nozzle 140 can be readily substituted for the outer spool 42 and the inlet nozzle 40 for use within the pilot valve 24 (or other pilot valves). In some respects, however, the outer spool 142 differs from the outer spool 42. For example, unlike outer spool 42, the outer spool 142 includes multiple recesses 166 that operate to provide different effective flow areas (and thus different flow rates for a given pressure differential) as a function of the position of the outer spool 142 relative to the inlet nozzle 140.

As illustrated in FIG. 4, the inlet nozzle 140 and outer spool 142 are arranged concentrically for relative axial translational movement, with the inlet nozzle 140 arranged as a radially outer flow-control component and the outer spool 142 arranged as a radially inner flow-control component. In other embodiments, other types of flow-control components can be used, according to the principles disclosed herein, as can other configurations of an inlet nozzle and an outer spool. Similarly, in different embodiments, the inlet nozzle 140 and the outer spool 142, or other similar flow-control components, can be used with a variety of other components, in a variety of different valve assemblies.

Figure 6A:
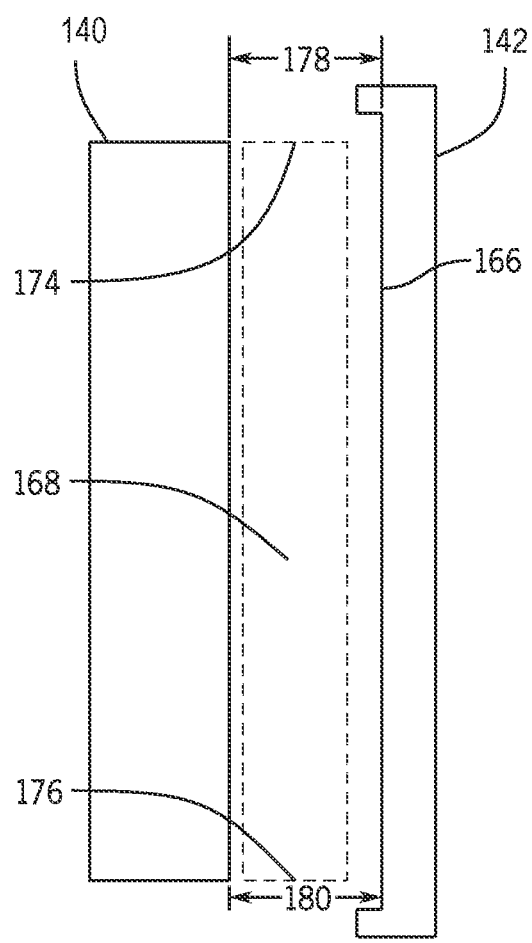
FIGS. 6a and 6b are partial schematic diagrams corresponding to the flow-control components of FIG. 4.
Figure 6B:
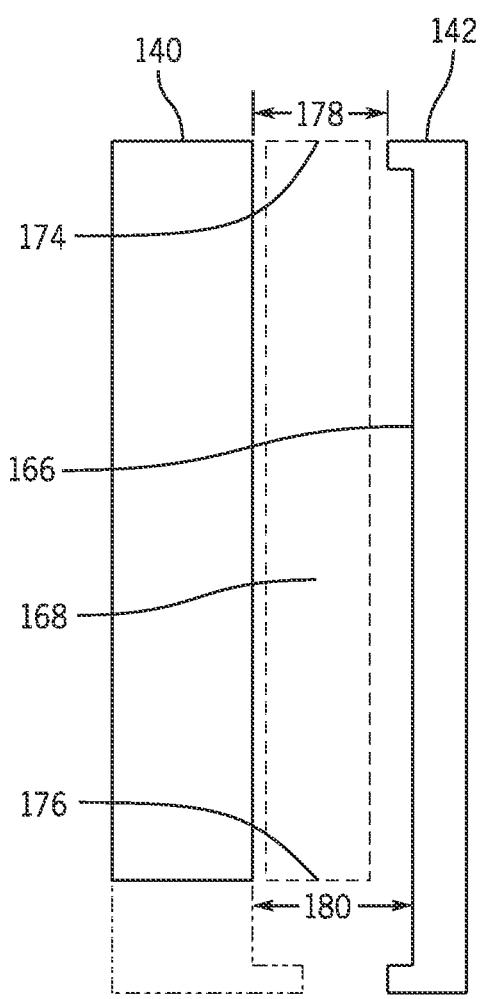

With reference also to FIGS. 6a and 6b, an interface zone 168 is defined by an area of overlap between the inlet nozzle 140 and the outer spool 142. In the illustrated example, the interface zone 168 is formed as an annular region, due to the shape and relative disposition of the inlet nozzle 140 and the outer spool 142, although other configurations are possible. The interface zone 168 can have an entrance end 174 and an exit end 176, which define an entrance flow area 178 and exit flow area 180. For the illustrated configuration, the entrance and exit flow areas 178, 180 define the cross-sectional area available for fluid flow into and out of the interface zone 168 respectively. Although the interface zone 168 is illustrated as having a constant length in FIGS. 8*a* and 8*b*, in some embodiments an interface zone can exhibit different lengths depending on the relative position of the relevant flow-control components. Likewise, although the entrance and exit flow areas 178, 180 are substantially annular in shape, in view of the shape of the inlet nozzle 140 and the outer spool 142, other geometric configurations are also possible (e.g., rectangular flow areas between planar flow-control surfaces). Further, in some examples, an interface zone may correspond to only part of an overlapping region of two (or more) flow control components, which may be subject to different magnitudes of flow restriction depending on the relative orientation of the flow control components.

In operation, as the inlet nozzle 140 and the outer spool 142 move relative to each other in response to changes in system pressure (e.g., as the outer spool 142 moves along the inlet nozzle 140 as similarly described relative to the pilot valve 24), the recesses 166 can provide for different degrees of flow restriction for flow through the interface zone 168. In a first configuration, for example, which may correspond to the system pressure being substantially below the set pressure of the control valve (e.g., during initial dome loading, including as may exist during system startup), the inlet nozzle 140 and the outer spool 142 are arranged as shown in FIGS. 4-5 and 6*a*. In this configuration, the upstream and downstream ends of the recesses 166 are "exposed" to the outside of the interface zone 168, i.e., the ends of the recesses 166 extend beyond the entrance end 174 and the exit end 176 of the interface zone 168 or are otherwise open to the outside of the interface zone 168. Accordingly, flow passing through the interface zone 168 between the inlet nozzle 140 and the outer spool 142 is not locally restricted at the ends of the recesses 166 (see FIG. 6*a*) and the entrance flow area 178 and the exit flow area 180 (see FIG. 6*a*) are relatively large. Thus, due to the relative position of the ends of the recesses 166, the inlet nozzle 140 and the outer spool 142 may facilitate relatively rapid flow along the interface zone 168, between the inlet nozzle 140 and the outer spool 142, and a correspondingly rapid loading of the main valve dome. This can be helpful, for example, during initial start-up loading of the dome, reloading of the dome after a relief event, or other low-pressure conditions (i.e., conditions with 40% or less of a relevant set pressure). However, although low pressure operation may be particularly notable in some cases, some embodiments disclosed herein can also be useful at higher pressures, including to help avoid unwanted valve opening in the case of sudden pressure surges.

In the illustrated example, with flow passing generally in the downward direction relative to FIGS. 6*a* and 6*b*, because first ends of the recesses 166 are exposed at the entrance end 174 of the interface zone 168, the entrance flow area 178 is not a local flow-limiting flow area in the first configuration. Likewise, because the second (opposite) ends of the recesses 166 are exposed at the exit end 176 of the interface zone 168, the exit flow area 180 is also not a local flow-limiting flow area in the first configuration. Rather, flow through the interface zone 168 is generally limited, for a given pressure, by the average spacing between the inlet nozzle 140 and the outer spool 142 along the interface zone 168.

In contrast, a second configuration is illustrated in FIG. 6*b*, which may correspond to the system pressure being above the pressure range that may correspond to the first configuration (as discussed above) but below the set pressure of the control valve (e.g., a pressure of 60% of system set pressure). In the second configuration, due to increased system pressure, the inlet nozzle 140 has translated along the outer spool 142 (i.e., upwards from the perspective of FIGS. 4-6*b*). Although the movement of the inlet nozzle 140 has not yet closed the flow path between the inlet nozzle 140 and the outer spool 142 (as comparably shown, for example, in FIG. 3*b*), it has shifted the entrance end 174 of the interface zone 168 out of alignment with the recesses 166. In other words, for the illustrated example, the ends of the recesses 166 are no longer exposed to the outside of the interface zone 168 at the entrance end 174 of the interface zone 168. Accordingly, the entrance flow area 178 has been reduced as compared with the entrance flow area 178 in the first configuration (see FIG. 6*a*), thus creating an effective constriction at the entrance flow area 178, i.e., a configuration of the relevant flow path at the entrance flow area 178 such that fluid cannot enter the interface zone 168 without passing a local flow restriction. Accordingly, the overall flow capacity of the flow path along the interface zone 168 between the inlet nozzle 140 and the outer spool 142 has been reduced as compared to in the first configuration (see FIG. 6*a*). Therefore, flow of fluid from the pressure source (i.e., the main system) into the main valve dome 13 may be slowed, as compared to the first configuration. As also noted above, for example, this may be useful in order to protect against adverse effects of pressure spikes at the main valve inlet.

As illustrated in FIG. 6*b*, the recesses 166 are not exposed at the entrance end 174 of the interface zone 168 in the second configuration, i.e., the ends of the recesses 166 do not extend beyond the entrance end 174 of the interface zone 168. As a result, the entrance flow area 178 is reduced relative to the first configuration and acts as a local flow-limiting flow area in the second configuration, as a function of the relative positions of the inlet nozzle 140 and outer spool 142.

However, in some embodiments, an exit flow area or an intermediate flow area between entrance and exit flow areas may operate as a local flow-limiting flow area. For example, some recesses may be exposed at an entrance end of an interface zone regardless of the relative position of the inlet nozzle and outer spool (or other flow-control components), while being either exposed or not exposed at an exit end of the interface zone, based on the relative positions of the inlet nozzle and outer spool. Such an arrangement, for example, may operate somewhat oppositely to the arrangement illustrated in FIGS. 6*a* and 6*b*, with relative restriction of flow at the exit end of the interface zone having corresponding effects on the total flow capacity of this portion of the larger system (e.g., as in FIGS. 6*a* and 6*b*, alternatively considering the entrance end 174 as an exit end, and the exit end 176 as an entrance end). As another example, features within an interface zone (e.g., not at an entrance or exit end thereof) may be moved into or out of alignment with other features in order to selectively restrict flow through the interface zone based on relative position of different flow-control components. For example, ridges or grooves within an interface zone may be moved into or out of alignment with other ridges or grooves by runtime movement of flow-control components, in order to change the flow capacity of an interface zone defined by the flow-control components. Further, some configurations may include different restrictions at opposing ends of an interface zone, including as may occur with the inlet nozzle 140 configured as shown in dotted lines in FIG. 6b.

In this regard, as also discussed below, it should be recognized that interface zones, flow areas, and flow-restricting features need not necessarily be arranged as annular features or in annular arrays. Similarly, flow control components need not necessarily be concentric or annular components and movement of flow control components such as may result in changed flow capacities over interface zones need not be axial movement.

Of note, in some embodiments, movement of flow-control components between first and second configurations, to change the flow capacity of a flow path defined by the flow-control components may generally still allow flow to continue along the flow path, so that a relevant dome can receive pressure signals from a pressure source. However, in some cases, further movement of the flow-control components can eventually close a flow path entirely—albeit temporarily—to flow. For example, from the configuration shown in FIG. 6b, continued pressurization at a main valve inlet (i.e., continued increase in system pressure) to the set pressure of the control valve and beyond can result in further translation of the inlet nozzle 140 relative to the outer spool 142 until a third configuration is reached. In the third configuration (not expressly shown but corresponding to the configuration illustrated in FIGS. 2a and 2b), the inlet nozzle 140 can contact an inlet seat attached to the outer spool 142 (in the same manner as outer spool 42) so that the flow path between the main valve inlet and a main valve dome is closed. Thereafter, depending on system pressure, the inlet nozzle 140 and the outer spool 142 can move together to open a path to pilot exhaust (e.g., as similarly shown and described with respect to FIGS. 3a and 3b), which can allow the pressure above the main valve dome to be vented, causing the main valve to open and relieve excess system pressure.

In different embodiments, different types of recesses (or other structures) can be used to provide changes in flow area depending on relative position of flow-control components. For example, in the embodiment illustrated in FIGS. 4 and 5, in particular, the recesses 166 are squared grooves that are arranged in an array around the circumference of the outer spool 142. Further, as shown in FIG. 5 in particular, the recesses 166 are arranged on the radially exterior surface of a smaller diameter upstream portion 142a of the outer spool 142, facing the radially interior surface of a smaller diameter upstream portion 140a of the inlet nozzle 140. Thus, the recesses 166 are arranged to selectively provide increased flow capacity along an interface zone that extends along an area of a relatively small clearance 190 between the inlet nozzle 140 and the outer spool 142, as opposed to an area of relatively large clearance 192 between larger diameter portions 140b, 142b of the inlet nozzle 140 and outer spool 142. Accordingly, the recesses 166 can provide relatively large percentage changes in flow capacity even when exhibiting relatively small overall depth.

In other embodiments, however, other configurations are possible. For example, grooves or other recesses may be created on any variety of other components. For example, with configurations that are otherwise generally similar to that of FIGS. 4 and 5, some embodiments can include recesses on the inner surface of an inlet nozzle, facing an outer surface of an outer spool, which itself may or may not include any recesses (e.g., as in FIGS. 6a and 6b, alternatively considering the schematically recessed profile of the outer spool 142 as being illustrated on the inlet nozzle 140).

Or recesses can be provided on entirely different flow-control components, to similar effect. Similarly, in some embodiments, recesses can be formed as rounded grooves or in other geometric configurations that facilitate control of flow area for a flow path between an inlet nozzle and an outer spool or other relevant flow-control components.

In some embodiments, recesses or other components to vary flow capacity can correspond to structural components with other purposes. For example, between each of the recesses 166, the inlet nozzle 140 includes contact portions, formed as non-recessed segments 179. The segments 179 extend outwardly relative to the recesses 166 and can contact the outer spool 142 during operation to guide the inlet nozzle 140 in axial translation as it moves along the outer spool 142. In some embodiments, however, different configurations of contact portions (or no contact portions at all) can be used.

As also noted above, the spatial extent of recesses or other flow-control features can also vary among different embodiments. For example, FIGS. 4 through 6b illustrate the recesses 166 having a length sufficient to extend axially beyond the entrance end 174 and the exit end 176 of the interface zone 168 and continuously along the interface zone 168 between the ends 174, 176. In some embodiments, recesses can be configured with a different length or overall orientation, so as to extend beyond only one of an entrance end or an exit end of an interface zone, depending on the direction of fluid flow and the expected relative movement of the flow-control components in a given pilot valve application. In some embodiments, recesses may extend beyond only one of an entrance end or an exit end of an interface zone, regardless of the relative position of the flow-control components, but may be exposed or blocked at the other of the entrance end or the exit end depending on the relative position of the flow-control components. Similarly, although the interface zone 168 is illustrated as extending over a full length of a particular surface of the inlet nozzle 140, some interface zones 168 may extend over only a portion of a surface of one or more relevant flow-control components.

As still another example, in some embodiments, changes in flow capacity for a flow path between flow-control components can be effected by protrusions rather than recesses, or a variety of other features. For example, internal protrusions along an interface zone may be configured to move into or out of alignment with other features along the interface zone, to selectively change the flow capacity along the interface zone depending on the relative orientation of the relevant flow-control components.

In some cases, relevant flow-control components can include multiple pieces of a valve assembly. Consequently, in some arrangements, a control valve may include multiple interface zones that can be configured to define an enlarged or reduced flow capacity (e.g., by defining an enlarged or reduced flow area at one or more entrances of the interface zones), depending on the relative movement of the flow-control components that may result from changes in system pressure.

Figure 7:
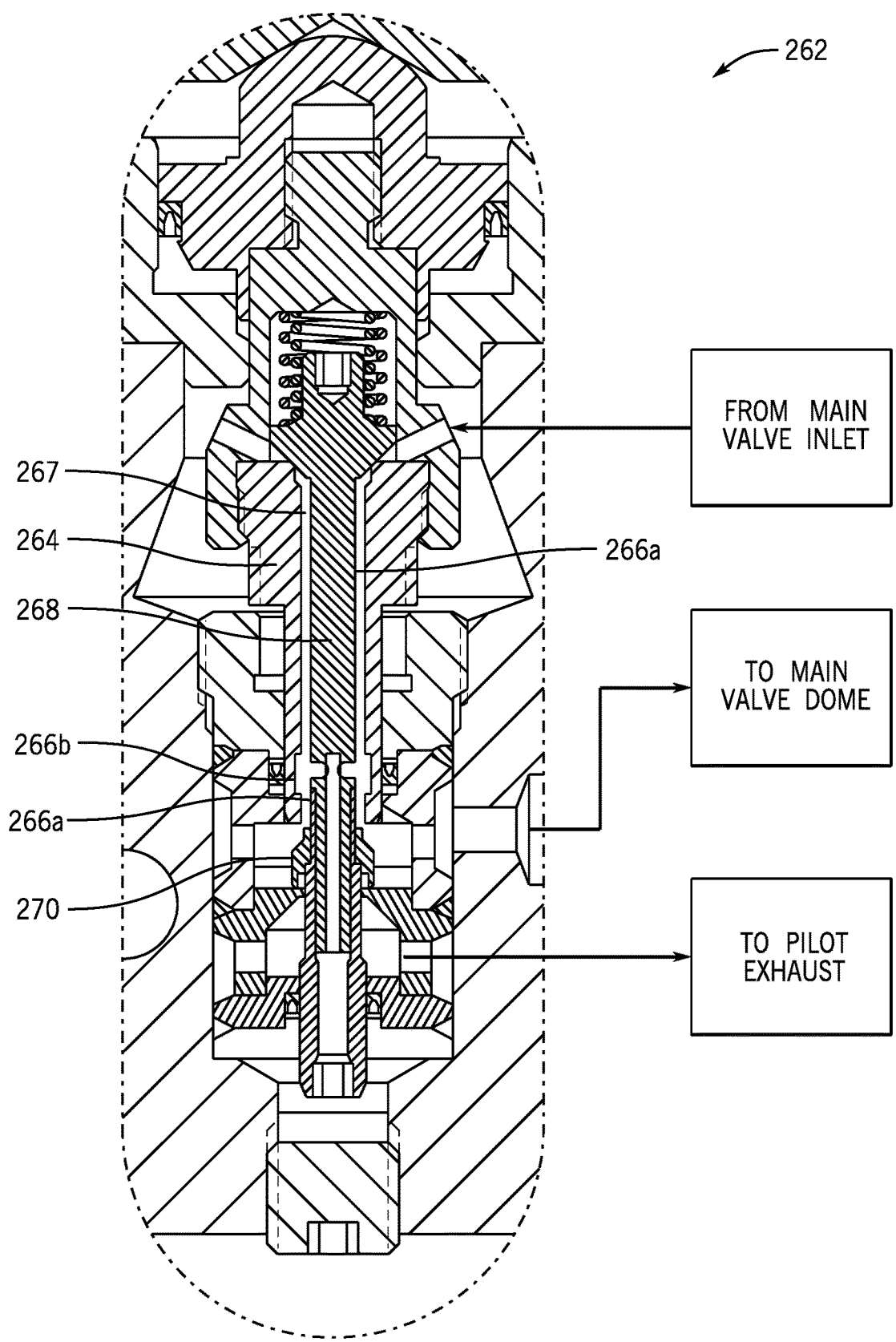
FIG. 7 is a partial cross-sectional view of a control valve according to an embodiment of the invention.

FIG. 7 illustrates an example of a control valve in which multiple flow-control component pieces are configured to provide, in combination, an enlarged flow area depending on relative orientation of the components (i.e., as controlled by changes in system pressure). In the illustrated embodiment, a flow arrangement 262 is provided for a control valve that is configured as a pilot valve of a pilot-operated pressure relief valve. The flow arrangement 262 includes an inlet nozzle 264, a stem 268, and a retainer 270. During operation of the control valve, inlet nozzle 264 moves relative to the stem 268 and retainer 270, depending on system pressure, to control fluid flow from the main valve inlet 3 to the main valve dome 13. Consequently, the inlet nozzle 264, stem 268 and retainer 270 or all three, can be configured with features that provide increased flow capacity in one configuration (e.g., at low system pressures) and decreased flow capacity in other configurations (e.g., as system pressure increases towards a set pressure). Accordingly, for example, the inlet nozzle 264, the stem 268, and the retainer 270 can cooperate to provide relatively rapid loading of a main valve dome (not shown in FIG. 7) for some pressure conditions (e.g., during start-up) and slower loading of the main valve dome at other times.

In different embodiments, different configurations are possible to effect the noted flow control. For example, in some embodiments, one or more of the inlet nozzle 264, the stem 268, or the retainer 270 can include one or more recesses (e.g., similar to the recesses 166 of FIGS. 4-6b), as may selectively create an enlarged flow area at an entrance or an exit of an interface zone 267 during initial loading of the main valve dome. For example, in the illustrated example, one recess 266a can be formed in the stem 268 and another recess 266b can be formed in the inlet nozzle 264. In other embodiments, other arrangements are possible, such as arrangements in which a flow capacity at the interface zone 267 is otherwise changed depending on the relative orientation of the retainer 270, the inlet nozzle 264, and the stem 268. Similarly, in different embodiments, multiple recesses can be formed on a single flow-control component, a single recess can be formed on each of multiple flow-control components, or multiple recesses can be formed on each of multiple flow-control components.

In other embodiments, other configurations are possible. For example, although some embodiments described above include recesses to selectively provide an enlarged flow area through an interface zone between two or more flow-control components, a more general flow arrangement between a pressure source and a target chamber is also contemplated. For example, FIGS. 8a and 8b schematically illustrate a general flow arrangement 272 having flow-control components 273, 274 that are arranged along a flow path between a pressure source and a dome, with one or both of the components 273, 274 being configured to move relative to (e.g., along) the other. Depending on the respective positions of the flow-control components 273, 274 relative to one another, the flow capacity between the flow-control components 273, 274 may be larger or smaller (e.g., via increase in relevant flow area), as illustrated by comparison between the interface zone 275 between FIGS. 8a and 8b, with corresponding increases or decreases in the rate of fluid flow between the pressure source and the dome, for a given system pressure. Particular implementations of the flow-control components 273, 274 may be annular in some embodiments, such as the embodiment illustrated in FIGS. 4 and 5, although other configurations are possible. Likewise, in some embodiments, the increase or decrease in flow capacity may result from exposure or constriction of (e.g., local blockage of) recesses or other features, depending on the relative position of the flow-control components 273, 274, or in other ways.

Figure 9B:
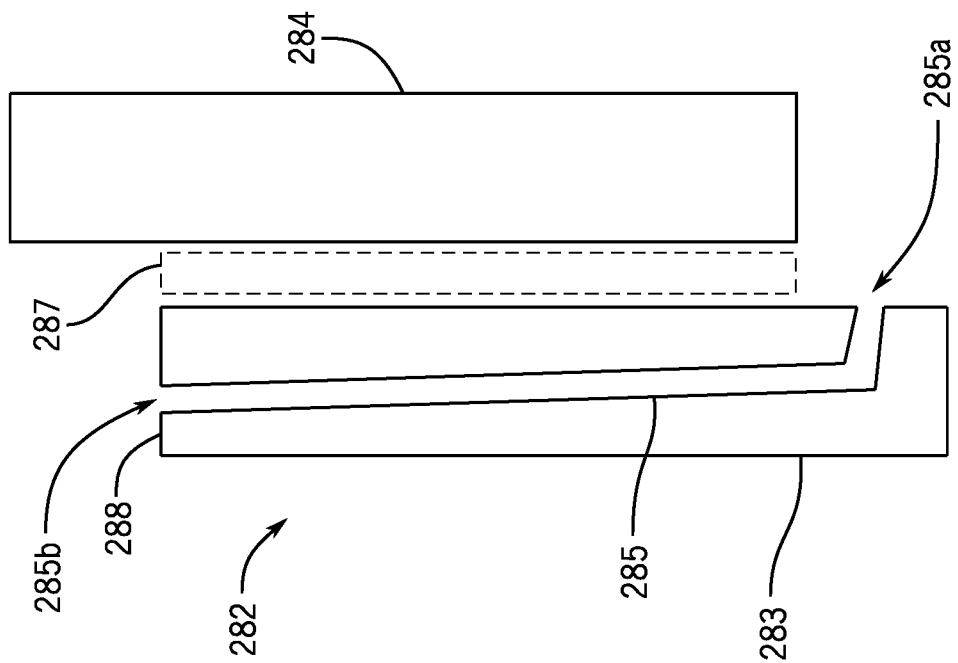
FIGS. 9a and 9b are schematic diagrams of a flow-control arrangement according to an embodiment of the invention.
Figure 9A:
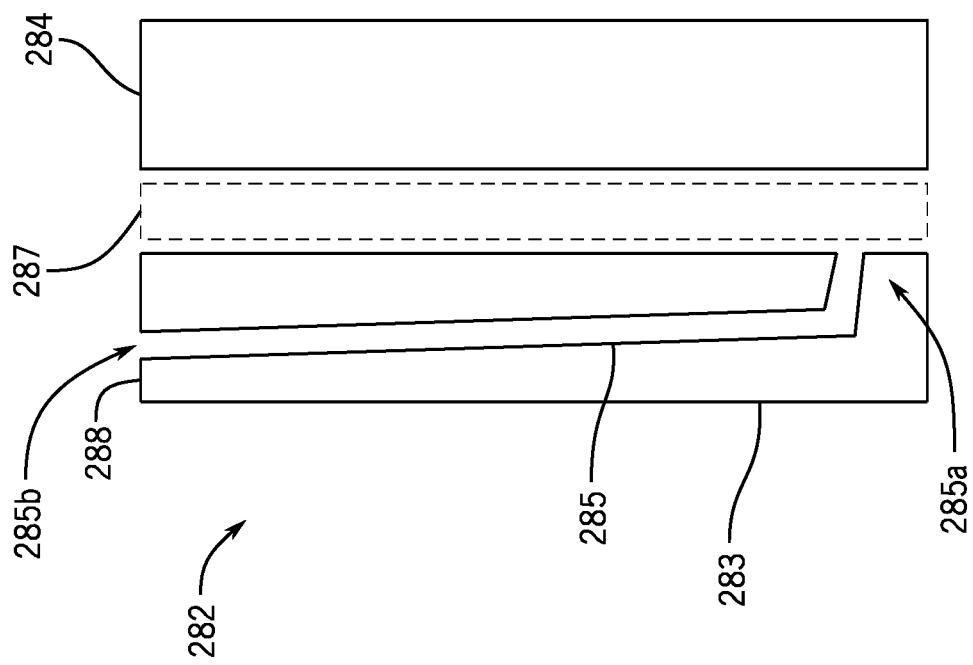

In some embodiments, selective increases and decreases in flow capacity can be effected by exposure or constriction of (e.g., local blockage of) ports, including in cases that include ports instead of recesses or other flow-control features. As illustrated in FIGS. 9a and 9b, for example, a flow arrangement 282 according to an embodiment of the invention includes flow-control components 283, 284, such as may be arranged between a pressure source and a dome (e.g., as part of a pilot valve). The flow-control component 283 includes one or more ports 285 (only one shown) that extend from an entrance port opening 285a through the flow-control component 283 to an exit port opening 285b, generally in parallel with a system flow direction. In the illustrated example, the entrance port opening 285a is on a radially interior surface of the flow-control component 283 and the exit port opening 285b is on an axially outer wall of the flow-control component 283, although other configurations are possible. Generally, a port such as the one or more ports 285 can be configured to be selectively blocked or exposed depending on the relative position of the relevant flow-control components, so that the port can provide increased flow capacity in some configurations but not in others. Accordingly, for example, ports can operate generally similarly to the recesses variously discussed above, to selectively provide more rapid loading of a relief valve dome.

In different embodiments, ports can be configured in a variety of ways. In the illustrated embodiment, for example, the port 285 is formed as a fully internal passageway that extends, with the flow arrangement 282 in a first configuration (see FIG. 9a), from an interface zone 287 between the flow-control components 283, 284 to an axially outer wall 288 of the flow-control component 283. In some implementations, the outer wall 288 can be a downstream wall of the flow arrangement 282, and in other configurations, the outer wall 288 can be an upstream wall of the flow arrangement 282. In the first configuration, as illustrated in FIG. 9a, the flow-control component 284 overlaps the port 285 along the interface zone 287 to create a constriction via a partial blockage of the port 285 and a correspondingly restricted overall flow capacity for the flow arrangement 282. In contrast, in a second configuration as illustrated in FIG. 9b, relative movement of one or both of the flow-control components 283, 284 along the other results in the port 285 being exposed beyond the interface zone 287, with a correspondingly increased overall flow capacity for the flow arrangement 282. In some embodiments, as similarly discussed above, the first configuration (see FIG. 9a) can correspond to operating pressures at which the dome is already loaded, such that the relatively restricted flow capacity may contribute to efficient operation of the pressure relief valve. Similarly, the second configuration (see FIG. 9b) can correspond to initial loading (or re-loading) of the dome, such that the larger effective flow area may increase overall flow capacity between the pressure source and the dome and allow quicker loading of the dome.

Thus, embodiments of the disclosed invention can provide an improvement over conventional valve assemblies, including conventional pilot-operated pressure relief valve assemblies. For example, some embodiments provide a control valve, such as a pilot valve for a pilot-operated pressure relief valve, with flow-control components that can provide for more rapid loading of main valve domes (e.g., during system start-up) while appropriately restricting flow to the domes during normal operation.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A pilot valve for control of a main valve in a pressure relief valve assembly, the main valve having a dome to control movement of a main valve piston relative to a main valve seat, and the pilot valve being configured to be in fluid communication with and selectively provide a flow path to the dome from a pressure source that is upstream of the main valve seat, the pilot valve comprising:
   an outer spool having a plurality of recesses extending axially along the outer spool between a first radial surface and a second radial surface that extend around a circumference of the outer spool, wherein each recess of the plurality of recesses is spaced apart from an adjacent recess of the plurality of recesses in a circumferential direction; and
   an inlet nozzle that is configured to move axially relative to the outer spool;
   wherein the inlet nozzle and the outer spool are arranged concentrically to define an annular region therebetween that extends between an axial entrance end that corresponds to an axial entrance area for axial flow into the annular region and an axial exit end that corresponds to an axial exit area for axial flow out of the annular region; and
   wherein the plurality of recesses extend at least partly along the annular region between the inlet nozzle and the outer spool, so that:
   when the outer spool and the inlet nozzle are in a first configuration for axial flow along the annular region, the plurality of recesses extend axially to the outside of the annular region at the axial entrance end to at least partially define a first entrance flow area for axial flow into the annular region at the axial entrance end; and
      when the outer spool and the inlet nozzle are in a second configuration for axial flow along the annular region, the plurality of recesses do not extend axially to the outside of the annular region at the axial entrance end, so that a second entrance flow area for axial flow into the annular region at the axial entrance end is at least partially defined by the first radial surface of the outer spool and not by the plurality of recesses;
      wherein the second non-zero flow area is smaller than the first non-zero flow area so that, in the first configuration, as compared to the second configuration, the plurality of recesses provide increased flow capacity for flow along the annular region.

2. The pilot valve of claim 1, wherein, in the first configuration, the plurality of recesses extend axially to the outside of the annular region at the axial exit end to at least partially define a first exit flow area for axial flow out of the annular region at the axial exit end.

3. The pilot valve of claim 2, wherein, with the outer spool and the inlet nozzle in the second configuration, the plurality of recesses extend axially to the outside of the axial annular region at the axial exit end to at least partially define a second exit flow area for axial flow out of the annular region at the axial exit end.

4. The pilot valve of claim 1, wherein the outer spool includes a smaller diameter upstream portion and a larger diameter downstream portion;
   wherein the inlet nozzle includes a smaller diameter upstream portion that overlaps with the smaller diameter upstream portion of the outer spool to provide a first clearance for flow, and a larger diameter downstream portion that overlaps with the larger diameter downstream portion of the outer spool to provide a second clearance for flow that is larger than the first clearance; and
   wherein the annular region and the plurality of recesses are arranged along the smaller diameter upstream portion of the outer spool.

5. The pilot valve of claim 1, wherein each of the plurality of recesses has a rectangular cross-section.

6. A valve for control of flow between a pressure source and a dome of a main valve in a pressure relief valve assembly, the valve comprising:
   a first flow-control component; and
   a second flow-control component,
   wherein the first and second flow-control components define a flow-control flow path between the first and second flow-control components, the flow-control path being configured to form at least part of a dome-loading flow path from the pressure source to the dome;
   wherein the first flow-control component includes a plurality of recesses that extend along the flow-control path, between the first and second flow-control components, in a main flow direction of the flow-control path, to at least partially define local flow areas for flow along the flow-control path in the main flow direction,
   wherein the second flow-control component defines an entrance location for flow into the flow-control flow path in the main flow direction, and an exit location for flow out of the flow-control flow path in the main flow direction; and
   wherein at least one of the first or second flow-control components is movable along the other of the first or second flow-control components between a first configuration and a second configuration, the first and second flow-control components being thereby aligned so that:
      in the first configuration, an upstream end of the plurality of recesses is at a first location, on an upstream side of the entrance location relative to the main flow direction, so that the first and second flow-control components, including the plurality of recesses, define a first non-zero flow area at the entrance location for flow in the main flow direction into the flow-control flow path; and
      in the second configuration, the upstream end of the plurality of recesses is in a second location that is downstream of the first location, relative to the main flow direction, so that the first and second flow-control components define a second non-zero flow area at the entrance location for flow into the flow-control flow path in the main flow direction, the second non-zero flow area being smaller than the first non-zero flow area.

7. The valve of claim 6, wherein the valve is configured as a pilot valve;
   wherein the first configuration corresponds to a loading configuration for loading of the dome by flow from the pressure source; and
   wherein the second configuration corresponds to operation of the valve with the pressure source at a higher pressure than in the first configuration.

8. The valve of claim 6,
   wherein a relative difference in position of the plurality of recesses at least one recess between the first and second configurations provides at least part of the difference between the first and second non-zero flow areas.

9. The valve of claim 8, wherein the flow-control flow path extends along an interface zone between the first and second flow-control components; and wherein at least one of the plurality of recesses has a length that is equal to or greater than a length of the interface zone.

10. The valve of claim 9, wherein the at least one of the plurality of recesses extends beyond a first end and a second end of the interface zone in the first configuration; and wherein the at least one of the plurality of recesses extends beyond only one of the first end or the second end of the interface zone in the second configuration.

11. The valve of claim 8, wherein a portion of the at least one of the first or second flow-control components that is in between adjacent recesses of the plurality of recesses is configured to contact the other of the at least one of the first or second flow-control components to guide axial relative movement of the first and second flow-control components.

12. The control valve of claim 6, wherein at least one of:

the first flow-control component includes a first set of multiple, distinct flow-control pieces; or the second flow-control component includes a second set of multiple, distinct flow-control pieces.

13. The valve of claim 6, wherein the entrance location is at an upstream end of the second flow-control component, so that an upstream end of the plurality of recesses extends past the upstream end of the second flow-control component in the first configuration.

14. A pilot valve for control of a pressure relief valve with a dome, the pilot valve being configured to be in fluid communication with a pressure source and to selectively provide a flow path from the pressure source to the dome, the pilot valve comprising:

a first flow-control component including a first annular body having: a first surface with a first diameter along a first portion of the first annular body, and a second surface with a second diameter along a second portion of the annular body, the second diameter being smaller than the first diameter; and a second flow-control component including a second annular body that is arranged to concentrically surround at least part of the first flow-control component, with a third surface of the second annular body extending along the second surface of the first annular body;

one or more recesses formed in the first flow-control component along the second surface;

wherein the pilot valve is thereby configured to provide part of the flow path between the pressure source and the dome, extending along a flow area between the second surface of the first flow-control component and the third surface of the second flow-control component, from an axial entrance area for axial flow into the flow area, to an axial exit area for axial flow out of the flow area, including along the one or more recesses;

wherein the first and second flow-control components are axially movable relative to each other between a first configuration and a second configuration; and wherein the one or more recesses extend outside of the flow area at the axial entrance area and the axial exit area in the first configuration, and the one or more recesses extend outside of the flow area at only one of the axial entrance area or the axial exit area in the second configuration, so that in the second configuration, as compared to in the first configuration, the first and second flow-control components provide a reduced non-zero flow capacity of the flow path between the axial entrance area and the axial exit area.

15. The pilot valve of claim 14, wherein the first configuration is a start-up or low-pressure loading configuration for loading the dome by flow from the pressure source; and wherein the second configuration corresponds to operation of the pilot valve to transmit pressure from the pressure source to the dome, with the pressure source at a higher pressure than in the first configuration.

16. The pilot valve of claim 15, wherein the first and second flow-control components are configured for continuous relative movement from the first configuration, through the second configuration, to a third configuration in which at least one of the first or second flow-control components closes the flow path to flow from the pressure source to the dome.

17. The pilot valve of claim 14, wherein at least one recess of the one or more recesses opens towards the third surface of the second flow-control component;

wherein, in the first configuration, the at least one recess extends along the flow path beyond the axial entrance area, in an upstream direction; and wherein, in the second configuration, the at least one recess is disposed fully downstream of the axial entrance area to reduce the flow capacity of the flow path.

18. The pilot valve of claim 17, wherein, in the first and second configurations, the at least one recess extends along the flow path beyond the axial exit area, in a downstream direction.

19. The pilot valve of claim 18, wherein the at least one recess is part of a plurality of recesses, each of the plurality of recesses being circumferentially spaced apart from adjacent recesses of the plurality of recesses along the annular body.

20. The pilot valve of claim 14, wherein the one or more recesses are formed on the second surface and extend over an axial recess length that is longer than the third surface.

* * * * *